(12) United States Patent
LeFevre et al.

(10) Patent No.: US 6,429,625 B1
(45) Date of Patent: Aug. 6, 2002

(54) METHOD AND APPARATUS FOR INDICATING BATTERY CHARGE STATUS

(75) Inventors: John S. LeFevre, Seattle; Alec Kwok, Newcastle; Keith Yamanaka, Edmonds, all of WA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/860,685

(22) Filed: May 18, 2001

(51) Int. Cl.[7] .............................. H02J 7/00; G08B 21/00
(52) U.S. Cl. .......................................... 320/155; 340/636
(58) Field of Search ................................. 320/155, 158; 340/636, 635; 713/322

(56) References Cited

U.S. PATENT DOCUMENTS

| | | |
|---|---|---|
| 5,570,025 A | 10/1996 | Lauritsen et al. |
| 5,623,193 A | 4/1997 | Lang et al. |
| 5,663,629 A | 9/1997 | Hinohara |
| 5,764,034 A * | 6/1998 | Bowman et al. ............ 320/155 |
| 5,973,497 A | 10/1999 | Bergk et al. |

OTHER PUBLICATIONS

Linear Technology LTC 1732–4/LTC 1732–4.2: Lithium–Ion Linear Battery Charger Controller (Oct. 2000).

* cited by examiner

Primary Examiner—Gregory Toatley
(74) Attorney, Agent, or Firm—Foley & Lardner

(57) ABSTRACT

A method of indicating when a rechargeable battery of a handheld computer has been fully charged is disclosed. The method includes determining an elapsed charging time and activating a charge completion indicator when the elapsed charging time exceeds a predetermined time and requiring no dependence on actual battery voltage or current.

46 Claims, 2 Drawing Sheets

METHOD AND APPARATUS FOR INDICATING BATTERY CHARGE STATUS

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as voice memo recording and telephony functions. Because of the small size and portability of handhelds, strict adherence to hardware constraints such as battery charge indicating hardware must be maintained. It is conventional to have lights and/or icons that indicate whether a battery is charged.

Handheld computing devices can include rechargeable batteries used to power the handheld computer and other on-board devices such as a wireless phone. The user must periodically recharge the rechargeable batteries by plugging the unit directly into a battery recharger or by placing the handheld computing device into a synchronization cradle that also functions as a battery charger.

Handheld computing devices typically have a battery charge indicator that informs the user whether the handheld computing device is currently being charged, and can indicate whether the battery is fully charged and may be removed from the charger.

To determine the status of the battery and therefore indicate to the user whether the battery has completed its charging process, both hardware and software are required. The handheld computing device must have hardware in the form of a battery voltage detector to measure the terminal voltage of the battery during charging. Additionally, a software algorithm is used to compare the measured voltage against a battery charge curve associated with the particular battery in the unit. The software algorithm can be complicated because the battery charge curve changes during the life of the battery as the maximum voltage changes.

The conventional methods of indicating whether the handheld computing device battery is fully charged are disadvantageous because the required hardware takes space and adds manufacturing cost to the unit, and the necessary software uses memory of the handheld unit that could otherwise be used for other functions.

Accordingly, there is a need for a handheld computing device that can indicate to the user when the rechargeable battery has been charged allowing the unit to be disconnected from the battery charger, but that does not require the hardware necessary to measure the battery voltage, as well as the software necessary to compute whether the battery is fully charged based on the output voltage of the battery. Further, there is a need for a handheld computing device including simplified and expense saving electronics that indicate whether a battery has been charged. Further still, there is a need for a handheld computing device including a simplified charging timer for indicating charge status.

The teachings hereinbelow extend to those embodiments that fall within the scope of the appended claims, regardless of whether they accomplish one or more of the above-mentioned needs.

SUMMARY

An exemplary embodiment relates to a method of indicating when a rechargeable battery of a handheld computer has been fully charged. The method includes the steps of determining an elapsed charging time and activating a charge completion indicator when the elapsed charging time exceeds a predetermined time and requiring no dependence on actual battery voltage or current.

Another exemplary embodiment relates to a handheld computer having a display, a rechargeable battery, and an operating system. The handheld computer also includes a battery charger and a timing routine that activates a charge completion indicator after the battery charger has been charging the rechargeable battery for a predetermined time the predetermined time being independent of a measured battery voltage or current.

Further, an exemplary embodiment relates to a method of indicating when a rechargeable battery has been fully charged. The method includes the steps of determining an elapsed charging time and activating a charge completion indicator when the elapsed charging time exceeds a predetermined time the predetermined time being independent of a measured battery voltage or current.

Further still, an exemplary embodiment relates to a method of charging a rechargeable battery of a handheld computer having a battery charger and a timer. The method includes the steps of electrically linking the battery and the battery charger thereby commencing battery charging and determining an elapsed charging time. Further, the method includes the step of indicating completion of battery charging when the elapsed charging time exceeds a predetermined time the predetermined time being independent of a measured battery voltage or current.

Yet further still, an exemplary embodiment relates to a synchronization cradle. The synchronization cradle includes a current source coupled to a battery charging circuit and a battery charge status indicator wherein the battery charge status indicator indicates that a rechargeable battery is fully charged after a predetermined charging time has elapsed the predetermined charging time being independent of a measured battery voltage or current.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
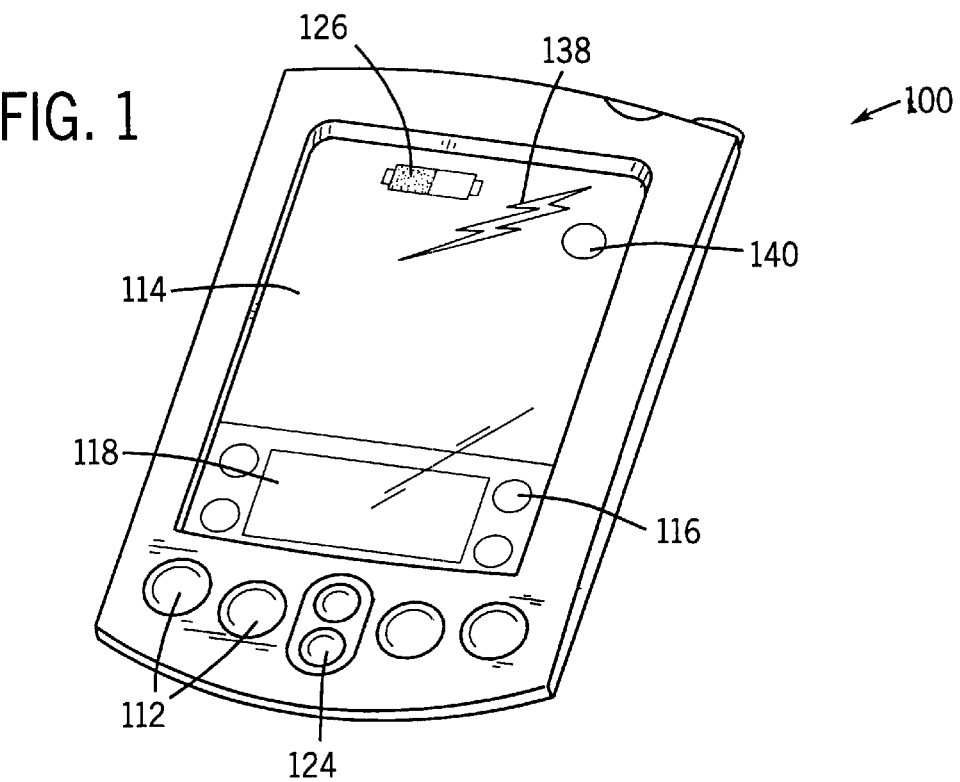
FIG. 1 is a front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as cellular telephones, and other mobile computing devices.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as wireless telephony.

Handheld computer 100, shown in FIG. 1 includes a plurality of input function keys 112 and a display 114 having graphical user interface features. Display 114 may be provided with a touch screen interface that allows a user to select and alter displayed content using a pointer, such as a stylus.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions maybe be provided on a portion of display 114.

In an exemplary embodiment, handheld computer 100 also includes navigation buttons 124 that may be utilized for navigating or scrolling of information presented on display 114. Further, navigation buttons 124 may be programmed for other uses depending on the application running on handheld computer 100.

Figure 2:
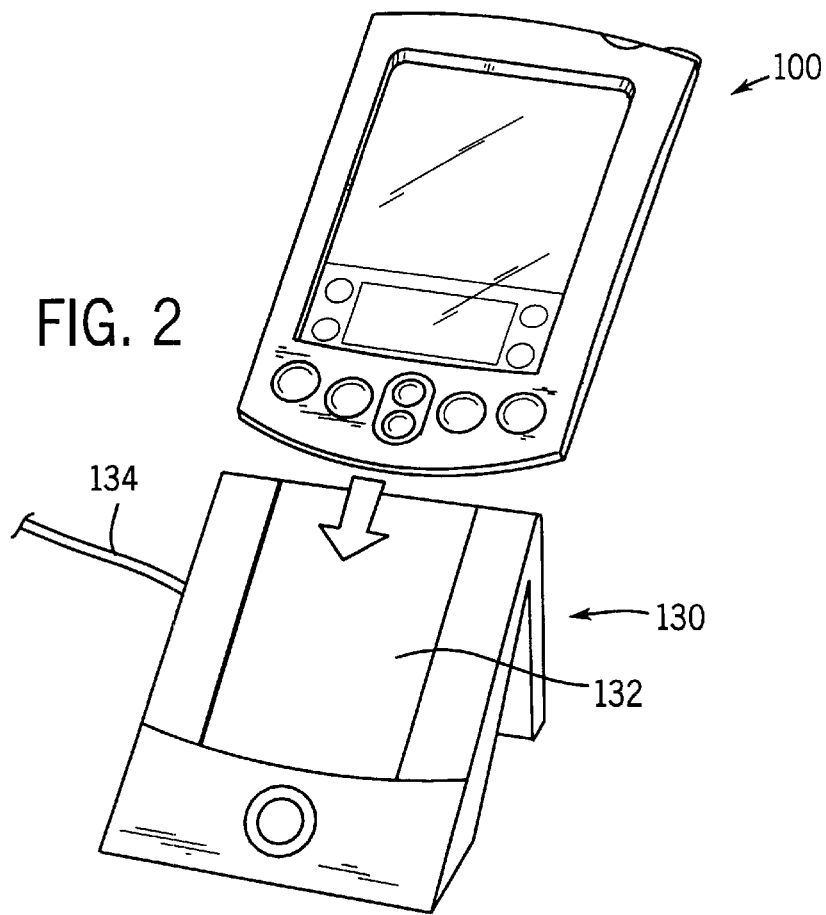
FIG. 2 is a perspective view of a handheld computer and a battery charging cradle.

Referring to FIG. 2, in an exemplary embodiment, handheld computer 100 may be coupled to a cradle, such as a synchronization cradle 130. The cradle 130 may include a slot 132 configured to receive handheld computer 100, and a power or data cord 134 (which, in an exemplary embodiment may be, but is not limited to a universal serial bus (USB) connector and card) that may be coupled to a personal computer and a wall outlet to supply power to cradle 130 (alternatively, cradle 130 may draw power through the data cord from the personal computer).

Handheld computer 100 further includes a battery used to power the various features of handheld computer 100. The battery may be a rechargeable lithium ion battery that requires periodic charging from an external power source. Display 114 may include a battery charge status indicator, shown as battery status icon 126. Battery status icon 126 may be configured to indicate to the user of handheld computer 100 the current state of the battery, or whether the battery has been fully charged.

Handheld computer 100 may be electrically coupled to cradle 130 via any of a variety of connectors, including but not limited to a universal connector in an exemplary embodiment. When handheld computer 100 is electrically connected to cradle 130, the battery may be charged. In a further exemplary embodiment, the battery may be charged when handheld computer 100 is coupled to an AC power cord that functions as a battery charger.

When the user desires to charge the battery of handheld computer 100, handheld computer 100 may be placed into cradle 130, which will permit the charging of the battery. Conventionally, an indicator on display 114 such as a charging indicator, shown as charge indicator icon 138 (see FIG. 1) indicates to the user that the handheld computer 100 is being charged. Charge indicator icon 138 may take the place of the battery status icon 126 on display 114 during the charging process such that the user must remove handheld computer 100 from cradle 130 to determine whether the battery is fully charged.

In another embodiment, battery charging icon 138 may be removed from display 114 when the battery has completed the charging process. Conventionally, in both of the aforementioned embodiments, handheld computer 100 must have means to measure the state (voltage and/or current) of the battery to determine whether the battery has been fully charged.

Figure 3:
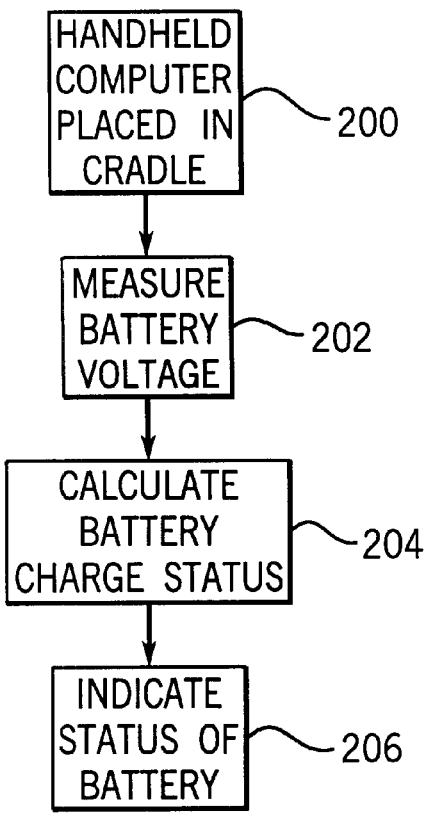
FIG. 3 is a flow chart depicting a conventional method of determining whether a rechargeable battery is fully charged.

Referring to FIG. 3, a conventional method of charging the battery and determining the battery charge status includes the following steps. First the user places handheld computer 100 into cradle 130 (step 200). Once handheld computer 100 is operatively connected to cradle 130, the battery begins charging and charge indicator icon 138 is presented on display 114. To determine the battery charge status, handheld computer must have means to test the battery terminal voltage (and/or current) (step 202). The battery terminal voltage (and/or current) is used as an input to a software algorithm to calculate the battery charge status depending on the battery terminal voltage and the particular characteristics of the battery used in handheld computer 100 (step 204). Handheld computer then indicates the charge status of the battery on display 114 (step 206).

The hardware necessary to measure the terminal voltage of the battery requires space on the circuit board of handheld computer 100. Accordingly, the necessary hardware also adds manufacturing cost to the unit. The software necessary to execute step 204 may further be complicated because it must take into account the particular battery used in handheld computer 100 as well as the charging time and terminal voltage of the battery. Such a software algorithm requires space in the memory of handheld computer 100. Further, the software algorithm used at step 204 may still be error prone as the battery gets older because the battery charge curve used to calculate the battery charge status changes over the life of the battery, possibly resulting in the user being provided false indication of whether the battery is fully charged.

Figure 4:
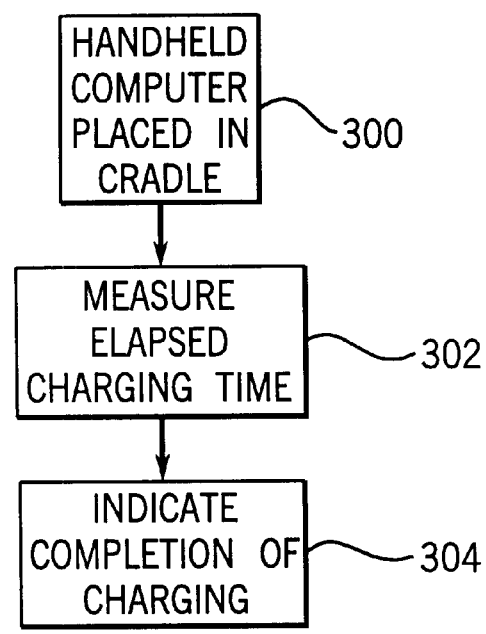
FIG. 4 is a flow chart depicting a method of indicating whether a rechargeable battery is fully charged.

Referring to FIG. 4, an exemplary embodiment of an improved method to indicate whether the battery has been fully charged includes a first step of the user placing handheld computer 100 into cradle 130 to begin the battery charging process (step 300). Rather than measuring the terminal voltage and using a software algorithm to determine the battery charge, handheld computer 100 includes a timer that measures the elapsed charging time (step 302). After a predetermined amount of time has elapsed, handheld computer 100 indicates that the battery charging process is complete (step 304). Accordingly, the need for hardware to measure the battery terminal voltage as well as software to calculate the battery charge status is rendered unnecessary.

The timer discussed with respect to step 302 may be a software algorithm that is part of the operating system of handheld computer 100. Alternative ways of installing a timing device to measure the elapsed charging time include timing electronics as well as wireless connections to a timing source over a communications network.

The predetermined time that is set to indicate when the battery is charged is chosen by assessing the particular type of battery used in handheld computer 100 and determining the period of time required to charge the battery from an initial completely discharged state to a fully charged state. In a further exemplary embodiment, the predetermined time can be increased to provide an engineering margin of error (or tolerance) to the selected time. Once the predetermined time is chosen, the handheld computer (or the timing electronics) is configured (programmed or initialized) such that the timer utilizes the predetermined length of time during the battery charging process. In a preferred embodiment, the predetermined time is set to six hours, which is a conservative time that can be used for many different models of handheld computer 100.

Handheld computer 100 may indicate the completion of battery charging at step 304 by removing battery charging icon 138 from display 114, or by activating a charge completion indicator indicating that battery charging is complete. Various types of charge completion indicators can include visual indicators such as icons presented on display 114 or alternatively an indicator light. Referring to FIG. 1, an exemplary charge completion indicator is shown as icon 140. The charge completion indicator can also be an audible signal such as a tone emitted from handheld computer 100.

The location of the visual charge completion indicator may vary depending on configuration of handheld computer 100 but in exemplary embodiments may be placed in various locations on display 114 as well as on the housing or cover of handheld computer 100. Further, the charge completion indicator as well as the timing electronics and/or program may be maintained on cradle 130.

In a further exemplary embodiment, the completion of battery charging may be indicated by removing charge indicator icon 138 from display 114 once the predetermined charging time has elapsed.

In a further embodiment, handheld computer 100 may be configured to change the predetermined time depending on the length of time handheld computer 100 has been discharging (the discharge time being stored by handheld computer 100 or alternatively by cradle 130). For example, if handheld computer 100 is disconnected from cradle 130 for a short period of time, it would not be necessary to initialize the charging cycle from the beginning when handheld computer 100 is again connected with cradle 130. Accordingly, if handheld computer 100 is fully charged and is removed from cradle 130 for a short period of time before reconnection with the charger, the predetermined time can be set to zero, thus continuing to indicate to the user that handheld computer 100 is fully charged, rather than displaying charge indicator icon 138 for several hours. In a preferred embodiment, the predetermined time will be set to zero if the discharge time is fifteen minutes or less, but a longer or shorter time may be used in other embodiments.

In another facet of the embodiment wherein handheld computer 100 is configured to change the predetermined time depending on the discharge time, the predetermined time may be set equal to a function of the discharge time. This may be useful when handheld computer 100 has been discharging for more than a short period of time, resulting in a less than fully charged battery, but does not require a full charging cycle. In an exemplary embodiment, the predetermined length of time is set equal to three times the discharge time, until the predetermined time reaches the full charging time (alternatively, other metrics may be used to determine when the full charging time should be set) initially programmed into handheld computer 100. The modification of the predetermined time of this embodiment does not require a measurement of battery current or voltage, but instead uses a timer, thereby precluding the need for additional hardware.

In a further exemplary embodiment, handheld computer 100 may update battery status icon 126 during the charging process by indicating the increase in battery charge as a linear function of the predetermined time such that the battery status icon 126 indicates that the battery is completely charged at the end of the predetermined time. The approach of this embodiment varies from conventional devices because the actual battery strength is not measured or calculated in order to update battery status icon 126, but rather the status of the battery is indicated (estimated) based on elapsed time using the timer mechanism.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of indicating when a rechargeable battery of a handheld computer has been fully charged, comprising the steps of:
   determining an elapsed charging time; and
   activating a charge completion indicator when the elapsed charging time exceeds a predetermined time and requiring no dependence on actual battery voltage or current.

2. The method of indicating when a rechargeable battery of a handheld computer has been fully charged of claim 1, wherein the predetermined time is the estimated time required to fully charge the rechargeable battery from a completely discharged condition.

3. The method of indicating when a rechargeable battery of a handheld computer has been fully charged of claim 1, wherein the charge completion indicator is a visible indicator.

4. The method of indicating when a rechargeable battery of a handheld computer has been fully charged of claim 3, wherein the charge completion indicator is an icon.

5. The method of indicating when a rechargeable battery of a handheld computer has been fully charged of claim 4, wherein the icon is presented on a screen.

6. The method of indicating when a rechargeable battery of a handheld computer has been fully charged of claim 1, wherein the charge completion indicator is an audible alarm.

7. The method of indicating when a rechargeable battery of a handheld computer has been fully charged of claim 1, further comprising the steps of:
   displaying a charging indicator; and
   altering the charging indicator when the elapsed charging time exceeds the predetermined time.

8. The method of indicating when a rechargeable battery of a handheld computer has been fully charged of claim 1, further comprising the step of indicating the battery charging status by displaying an icon that changes as a linear function of the elapsed charging time.

9. The method of indicating when a rechargeable battery of a handheld computer has been fully charged of claim 1, further comprising:
   calculating a discharge time; and
   setting the predetermined time equal to zero if the discharge time is less than a first period of time.

10. The method of indicating when a rechargeable battery of a handheld computer has been fully charged of claim 9, wherein the first period of time is fifteen minutes.

11. The method of indicating when a rechargeable battery of a handheld computer has been fully charged of claim 1, further comprising:
   calculating a discharge time; and
   setting the predetermined time equal to a function of the discharge time.

12. The method of indicating when a rechargeable battery of a handheld computer has been fully charged of claim 11, wherein the predetermined time is set equal to three times the discharge time.

13. A handheld computer, comprising:
   a display;
   a rechargeable battery;
   an operating system;
   a battery charger; and
   a timing routine, wherein the timing routine activates a charge completion indicator after the battery charger has been charging the rechargeable battery for a predetermined time the predetermined time being independent of a measured battery voltage or current.

14. The handheld computer of claim 13, wherein the predetermined time is the time required to fully charge the rechargeable battery from a completely discharged condition.

15. The handheld computer of claim 13, wherein the charge completion indicator is a visible indicator.

16. The handheld computer of claim 15, wherein the charge completion indicator is an icon.

17. The handheld computer of claim 16, wherein the icon is presented on a screen.

18. The handheld computer of claim 13, wherein the charge completion indicator is an audible alarm.

19. The handheld computer of claim 13, wherein the handheld computer indicates the battery charging status by displaying an icon that changes as a linear function of the elapsed charging time.

20. The handheld computer of claim 13, wherein the timing routine is a software routine residing in the operating system.

21. The handheld computer of claim 13, wherein the timing routine is part of the battery charger.

22. The handheld computer of claim 13, wherein the battery charger is a synchronization cradle.

23. The handheld computer of claim 13, wherein the battery charger is an AC power cord.

24. The handheld computer of claim 13, wherein the predetermined time is a function of a battery discharge time.

25. The handheld computer of claim 24, wherein the predetermined time is zero if the battery discharge time is less than fifteen minutes.

26. The handheld computer of claim 24, wherein the predetermined time is equal to three times the battery discharge time.

27. A method of indicating when a rechargeable battery has been fully charged, comprising the steps of:
   determining an elapsed charging time; and
   activating a charge completion indicator when the elapsed charging time exceeds a predetermined time the predetermined time being independent of a measured battery voltage or current.

28. The method of indicating when a rechargeable battery has been fully charged of claim 27, wherein the predetermined time is the estimated time required to fully charge the rechargeable battery from a completely discharged condition.

29. The method of indicating when a rechargeable battery has been fully charged of claim 27, wherein the charge completion indicator is a visible indicator.

30. The method of indicating when a rechargeable battery has been fully charged of claim 27, wherein the charge completion indicator is an audible alarm.

31. A method of charging a rechargeable battery of a handheld computer, comprising the steps of:
   providing a battery charger;
   providing a timer;
   electrically linking the rechargeable battery and the battery charger, thereby commencing battery charging;
   determining an elapsed charging time; and
   indicating completion of battery charging when the elapsed charging time exceeds a predetermined time the predetermined time being independent of a measured battery voltage or current.

32. The method of charging a rechargeable battery of a handheld computer of claim 31, wherein the predetermined time is the estimated time required to fully charge the rechargeable battery from a completely discharged condition.

33. The method of charging a rechargeable battery of a handheld computer of claim 31, wherein a charge completion indicator is activated to indicate completion of battery charging.

34. The method of charging a rechargeable battery of a handheld computer of claim 31, wherein the charge completion indicator is a visible indicator.

35. The method of charging a rechargeable battery of a handheld computer of claim 34, wherein the charge completion indicator is an icon.

36. The method of charging a rechargeable battery of a handheld computer of claim 35, wherein the icon is presented on a screen.

37. The method of charging a rechargeable battery of a handheld computer of claim 31, wherein the charge completion indicator is an audible alarm.

38. The method of charging a rechargeable battery of a handheld computer of claim 31, further comprising the steps of:
   displaying a charging indicator; and
   removing the charging indicator when the elapsed charging time exceeds the predetermined time.

39. The method of charging a rechargeable battery of a handheld computer of claim 31, further comprising the step of indicating the status of battery charging with an indicator that changes as a linear function of the elapsed charging time.

40. The method of charging a rechargeable battery of a handheld computer of claim 31, wherein the timer is a software routine residing in an operating system of the handheld computer.

41. The method of charging a rechargeable battery of a handheld computer of claim 31, wherein the timer is part of the battery charger.

42. The method of charging a rechargeable battery of a handheld computer of claim 31, wherein the battery charger is a synchronization cradle.

43. The method of charging a rechargeable battery of a handheld computer of claim 31, wherein the battery charger is an AC power cord.

44. A synchronization cradle, comprising:
   a current source coupled to a battery charging circuit; and
   a battery charge status indicator;
   wherein the battery charge status indicator indicates that a rechargeable battery is fully charged after a predetermined charging time has elapsed the predetermined charging time being independent of a measured battery voltage or current.

45. The synchronization cradle of claim 44, wherein the predetermined elapsed charging time is the estimated time required to fully charge the rechargeable battery from a completely discharged condition.

46. The synchronization cradle of claim 44, wherein the synchronization cradle indicates the status of battery charging by displaying an indicator that changes as a linear function of the elapsed charging time.

* * * * *